(12) United States Patent
Takeuchi (10) Patent No.: US 9,955,078 B2
(45) Date of Patent: Apr. 24, 2018

(54) IMAGE SHAKE CORRECTION DEVICE, CONTROL METHOD, AND IMAGE PICKUP APPARATUS

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/227,213

(22) Filed: Aug. 3, 2016

(65) Prior Publication Data

US 2017/0041547 A1 Feb. 9, 2017

(30) Foreign Application Priority Data

Aug. 5, 2015 (JP) .................................. 2015-155113

(51) Int. Cl.
*H04N 5/232* (2006.01)

(52) U.S. Cl.
CPC ..... *H04N 5/23287* (2013.01); *H04N 5/23254* (2013.01); *H04N 5/23258* (2013.01)

(58) Field of Classification Search
CPC ...... H04N 5/2328–5/23287; G06T 7/20–7/292
See application file for complete search history.

(56) References Cited

U.S. PATENT DOCUMENTS

2012/0033091 A1* 2/2012 Miyasako .......... H04N 5/23254
                                                              348/208.1
2016/0316146 A1* 10/2016 Kajimura ........... H04N 5/23287

FOREIGN PATENT DOCUMENTS

JP           2005-203861 A      7/2005

* cited by examiner

*Primary Examiner* — Paul Berardesca
(74) *Attorney, Agent, or Firm* — Cowan, Liebowitz & Latman, P.C.

(57) ABSTRACT

An image shake correction device provided in an image pickup apparatus drives an image shake correction lens on the basis of detection information about shaking and corrects the image shake. An angular velocity sensor detects an angular velocity of shaking, and a motion vector detection unit detects a motion vector from a plurality of images that has been captured. An adaptive digital filter and an adaptive algorithm unit perform a process that generates a compensation value for a shake correction remainder, and FF (feed forward) control is performed in accordance with the result of the process. In the FF control, a filter coefficient of the adaptive digital filter is adjusted on the basis of the motion vector and a detection signal for shaking. The control filter calculates a feedback control amount so as to track the position of the image shake correction lens to a target position. An image shake correction lens drive unit performs the drive control of the image shake correction lens in accordance with the output of the control filter.

12 Claims, 6 Drawing Sheets

IMAGE SHAKE CORRECTION DEVICE, CONTROL METHOD, AND IMAGE PICKUP APPARATUS

BACKGROUND OF THE INVENTION

Field of the Invention

The present invention relates to image shake correction control using detected information about shaking applied to a device and a motion vector that is calculated from an image signal.

Description of the Related Art

In image pickup apparatuses, accompanying the miniaturization of the apparatus and the higher magnification of optical systems, shaking such as hand shaking remarkably affects an image, and accordingly an image pickup apparatus that includes an image shake correction function has been proposed. The image shake correction function is a function that corrects the image shake of an image due to shaking of the image pickup apparatus. As techniques for improving a correction accuracy of the image shake, there is a method that uses a process that detects a motion vector detected from deviation between a plurality of images, in addition to the use of a shake detection sensor that detects shaking. In an apparatus disclosed in Japanese Patent Application Laid-Open Publication No. 2005-203861, an output gain of the shake detection sensor is changed by using motion vector information, the detected deviation from an actual shake amount by the shake detection sensor is then corrected, and as a result, the image shake correction effect can be enhanced.

However, the technique of Japanese Patent Application Laid-Open Publication No. 2005-203861 only changes the output gain of the shake detection sensor, and simply corrects the deviation of the output gain (sensitivity deviation) of the shake detection sensor against the actual shake amount. In addition to the deviation of the output gain of the shake detection sensor, reasons for decreasing the correction accuracy of the image shake are as follows:

Deviation in the phase of the output of the shake detection sensor with respect to the actual shake;

Variations in mechanical characteristics of the image shake correction device that are driven based on a target signal that has been calculated from the output of the shake detection sensor (including variations of frequency response); and Variations of characteristics of a mechanical unit due to temperature fluctuations or the like in photographing environment.

Therefore, it is difficult to improve the image shake correction accuracy by only changing the output gain of the shake detection sensor.

SUMMARY OF THE INVENTION

The present invention improves an accuracy of correction by an image shake correction device.

An image shake correction device of one embodiment of the present invention is an image shake correction device that corrects an image shake of an image by an image shake correction unit comprising: an acquisition unit configured to acquire a detection signal for shaking applied to the image pickup apparatus, and a motion vector detected from an image signal; a calculation unit configured to calculate a correction value of image shake correction from the detection signal for shaking; a filter unit configured to calculate a compensation value for the correction value of the image shake correction by using the detection signal for shaking; an adjustment unit configured to adjust transmittance characteristics of the filter unit by the detection signal for shaking and the motion vector; and a control unit configured to control the image shake correction unit in accordance with the correction value and the compensation value.

Further features of the present invention will become apparent from the following description of exemplary embodiments (with reference to the attached drawings).

DESCRIPTION OF THE EMBODIMENTS

Hereinafter, a detailed description will be given of each embodiment of the present invention with reference to the accompanying drawings.

(First Embodiment)

Figure 1:
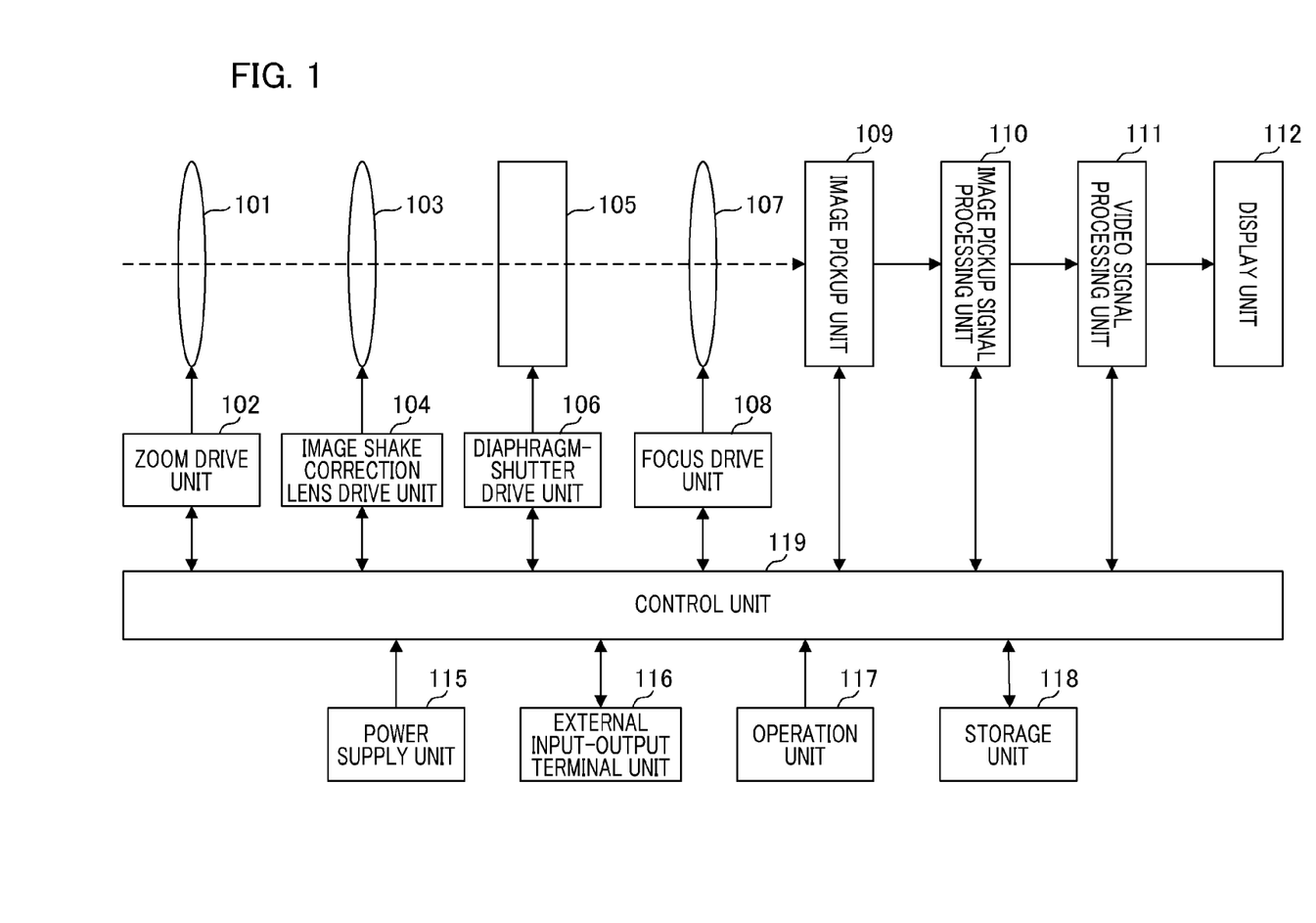
FIG. 1 is a block diagram illustrating a functional configuration example of an image pickup apparatus according to the embodiments of the present invention.

FIG. 1 is a block diagram illustrating a schematic configuration of an image pickup apparatus according to a first embodiment of the present invention. In the present embodiment, a description will be given of a digital camera serving as an example of an image pickup apparatus that is equipped with an image shake correction device. Note that the image pickup apparatus of the present embodiment may be provided with a moving image photographing function.

A zoom lens 101 in FIG. 1 configures an imaging optical system. A zoom drive unit 102 controls the drive of the zoom lens 101 in accordance with a control signal of a control unit 119, drives the lens in the optical axis direction of the imaging optical system, and consequently changes a focal length. An image shake correction lens (hereinafter, simply referred to as a "correction lens") 103 is a correction member that corrects an image shake of an image due to hand shaking or the like. The correction lens 103 is movable in a direction orthogonal to the optical axis of the imaging optical system, and the drive of the correction lens 103 is controlled by an image shake correction lens drive unit 104. A diaphragm-shutter unit 105 is a mechanical shutter having a diaphragm function. A diaphragm-shutter drive unit 106 drives the diaphragm-shutter unit 105 in accordance with a control signal of the control unit 119. A focus lens 107 configures the imaging optical system and is a focus adjustment lens that is reciprocally movable in the optical axis direction of the imaging optical system. A focus drive unit 108 drives the focus lens 107 in accordance with the control signal of the control unit 119.

An image capture unit 109 has an image capture element, for example, a CCD (charge-coupled device) image sensor, and a CMOS (complementary metal oxide semiconductor) image sensor. The image capture element photoelectrically converts an optical image of an object imaged by the imaging optical system into an electric signal. An image capture signal processing unit 110 performs processing including A (analog)/D (digital) conversion, correlated double sampling, gamma correction, white balance correction, color interpolation, and the like to the electric signal that has been output from the image capture unit 109 and converts the signal into a video signal. A video signal processing unit 111 processes the video signal that has been output from the image capture signal processing unit 110, according to the use. Specifically, the video signal processing unit 111 performs processing that includes the generation of a display video signal, encoding for recording, data filing, and the like.

A display unit 112 performs image display as necessary on the basis of the display video signal that is output by the video image signal processing unit 111. A power supply unit 115 supplies power to the entire image pickup apparatus according to the use. An external input-output terminal unit 116 inputs and outputs communication signals and video signals to and from an external device. An operation unit 117 has a button, a switch, or the like for giving an instruction from a user to the image pickup apparatus. The operation unit 117 includes a release button that is configured such that a first switch (SW1) and a second switch (SW2) are sequentially turned on in response to the pressing amount. The first switch SW1 is turned on when the release button is pressed halfway, and the second switch SW2 is turned on when the release button is pushed all the way. A storage unit 118 stores the video signal and signals for various kinds of information.

The control unit 119 has, for example, a CPU (Central Processing Unit), a ROM (Read Only Memory), and a RAM (Random Access Memory). A control program stored in the ROM is deployed in the RAM, and each unit of the image pickup apparatus is controlled by the execution of the CPU. Additionally, the control unit 119 performs AE (automatic exposure) processing that determines an aperture value and a shutter speed for acquiring an appropriate exposure amount, on the basis of the luminance information about the video signal and a program profile that has previously been determined.

Next, a description will be given of the operation of the image capturing apparatus. When the first switch SW1 of the release switch is turned on by the user's operation, the control unit 119 calculates an AF (automatic focusing) evaluation value based on the display video signal that is output to the display unit 112 by the video signal processing unit 111. The AF evaluation value is used for automatic focus, and the control unit 119 controls the focus drive unit 108 on the basis of the AF evaluation value. Additionally, when the second switch SW2 of the release switch is turned on, the control unit 119 performs a photographing operation at the aperture value and the shutter speed that have been determined. A video signal that has been acquired by processing the electric signal that has been read from the image capture unit 109 is stored in the storage unit 118.

The operation unit 117 has an image shake correction switch that can select ON/OFF of an image shake correction mode. When the user operates the image shake correction switch and the image shake correction mode is turned ON, the control unit 119 instructs the image shake correction lens drive unit 104 to perform the operation of the image shake correction. The image shake correction lens drive unit 104 that has received this instruction performs the image shake correction operation until an OFF instruction of the image shake correction operation is performed. The operation unit 117 has a photographing mode selection switch that can select either one of a still image photographing mode and a moving image photographing mode. When the user operates the photographing mode selection switch, the control unit 119 changes the operation condition of the image shake correction lens drive unit 104 in accordance with the selection result for the photographing mode.

Additionally, the operation unit 117 has a reproduction mode selection switch for selecting the reproduction mode. When the user operates the reproduction mode selection switch, the control unit 119 stops the image shake correction operation in accordance with the selection of the reproduction mode. Additionally, the operation unit 117 includes a magnification change switch that provides instructions for a zoom magnification change. When the user's operation of the magnification change switch provides instructions for a zoom magnification change, the control unit 119 instructs the zoom drive unit 102 to drive the zoom lens 101, and the zoom lens 101 moves to the instructed zoom position.

Figure 2:
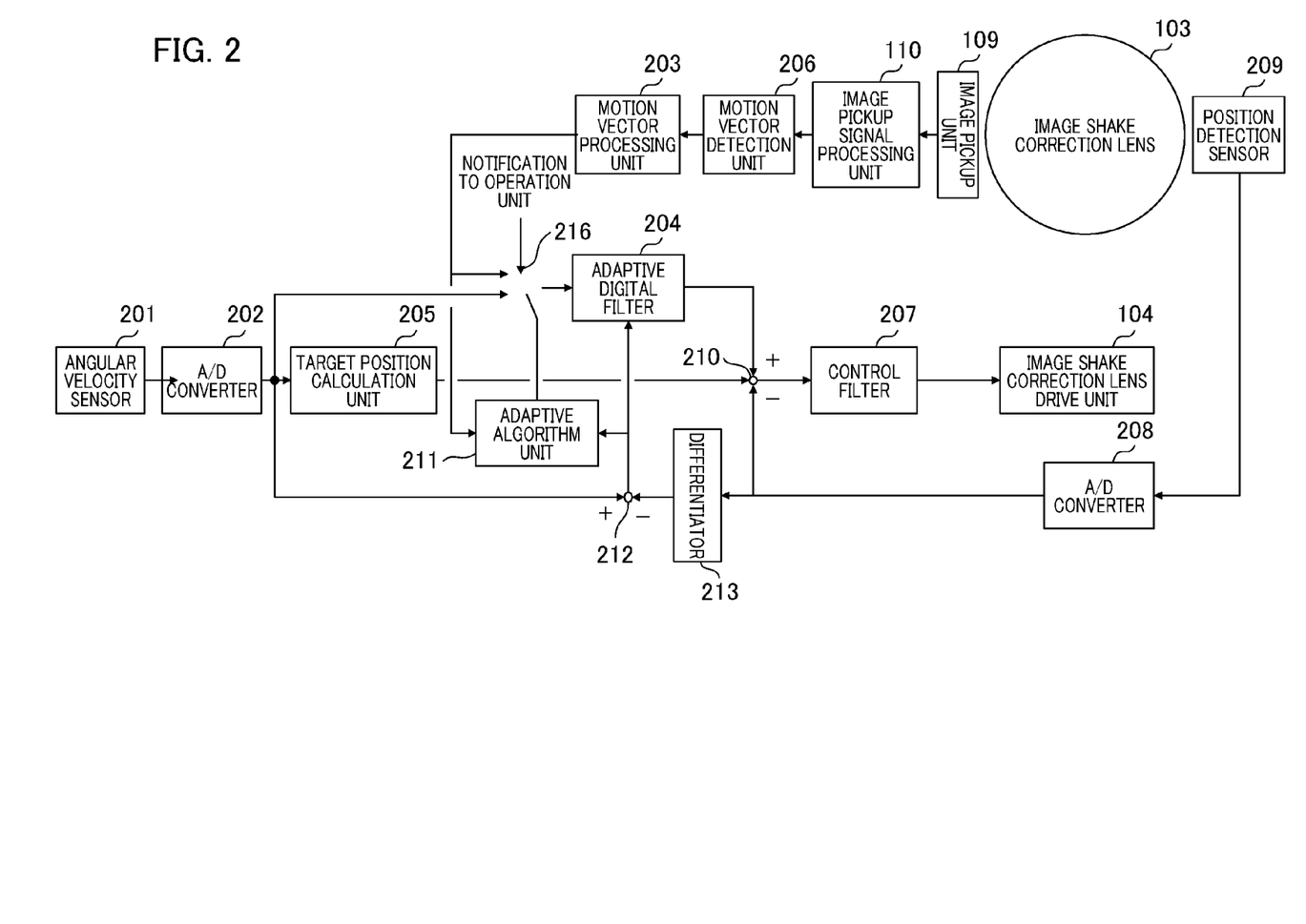
FIG. 2 is a block diagram illustrating a configuration according to a first embodiment of the present invention.

FIG. 2 is a block diagram illustrating a simplified portion of an adaptive digital filter unit and image shake correction control using a motion vector. An angular velocity sensor 201 detects a camera shake and outputs an angular velocity detection signal. An A/D converter 202 converts the angular velocity detection signal into a digital signal and outputs it to a target position calculation unit 205. The output of the target position calculation unit 205 is transmitted to an addition-subtraction unit 210, and the calculation result of the addition-subtraction unit 210 is output to the image shake correction lens drive unit 104 via a control filter 207.

A position detection sensor 209 detects the position of the correction lens 103, and outputs a position detection signal indicating the position information to an A/D converter 208. The A/D converter 208 converts the position detection signal into a digital signal and outputs it to the addition-subtraction unit 210 and a differentiator 213. The calculation result of the differentiator 213 is output to an addition-subtraction unit 212, and the calculation result of the addition-subtraction unit 212 is output to each of an adaptive digital filter 204 and an adaptive algorithm unit 211.

Figure 3:
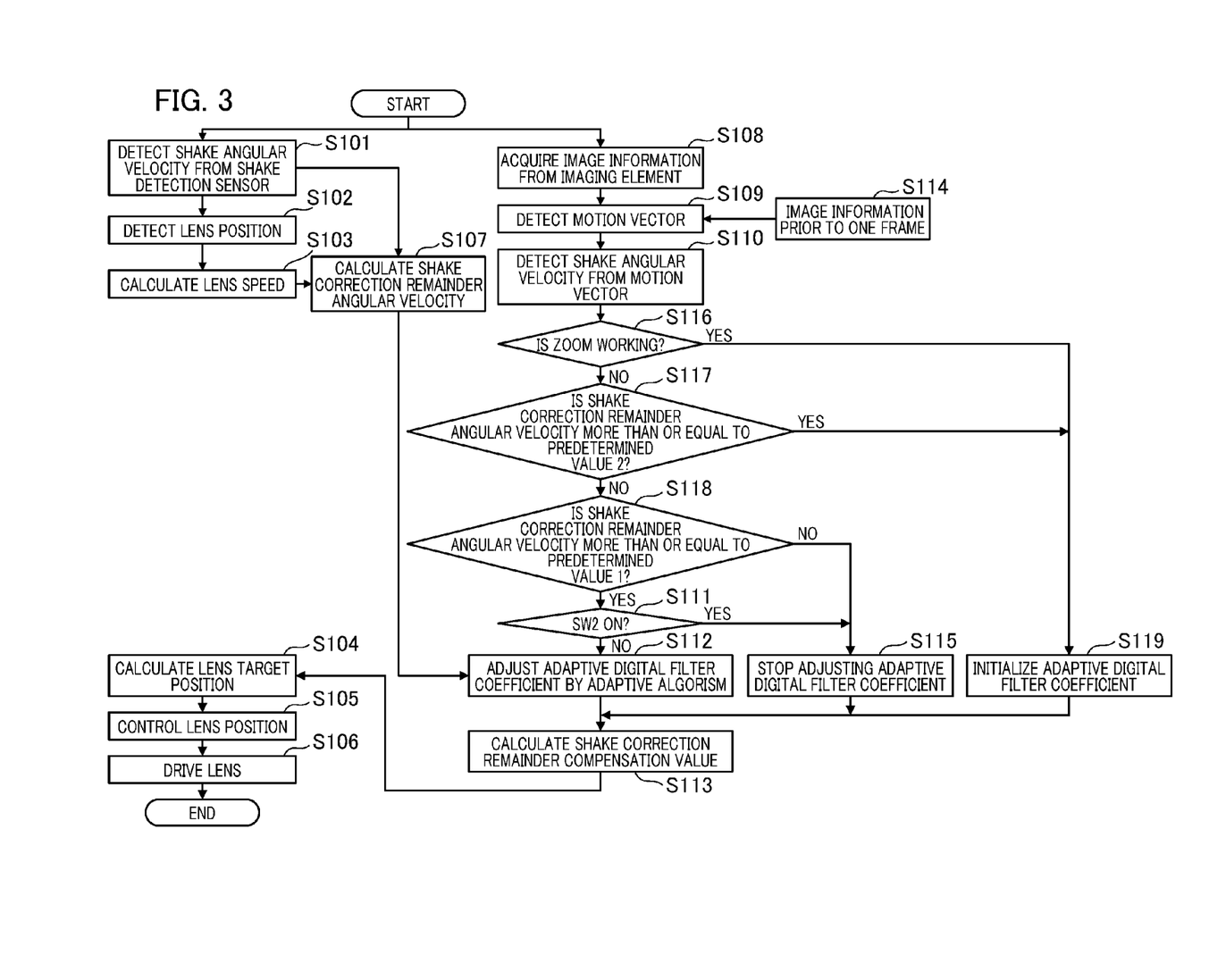
FIG. 3 is a flowchart explaining an image shake correction function and an operation of an adaptive digital filter unit.

The image data that has been acquired by the image capture unit 109 is processed by the image capture signal processing unit 110. A motion vector detection unit 206 detects a motion vector from the signal after processing. A motion vector processing unit 203 acquires the detected motion vector, and outputs data of processing result to the adaptive algorithm unit 211 and a switching unit 216. Referring to FIG. 3, a detailed description will be given of the image shake correction operation by the correction lens 103.

A flowchart of FIG. 3 illustrates image shake correction processing, and the processing is repeatedly executed in a predetermined sampling cycle. When the processing starts, the first processing shown in S101 to S107 and the second processing shown in S108 to S119 are executed in parallel. First, the first processing will be described.

In step S101, the angular velocity sensor 201 detects shaking of the entire image pickup apparatus due to a hand shaking or the like, and outputs the detected shake information (angular velocity) as an electric signal. The A/D converter 202 acquires the output of the angular velocity sensor 201 and converts it from an analog signal to a digital signal. Next, in S102, the position detection sensor 209 detects the position of the correction lens 103 and outputs a position detection signal. The A/D converter 208 acquires the position detection signal and converts it from an analog signal to a digital signal. In S103, the differentiator 213 calculates moving speed information based on the position detection signal of the correction lens 103. Specifically, the moving speed information about the correcting lens 103 is calculated by calculating a difference between the position detection signal of the correcting lens 103 that was acquired at the timing of the previous sampling and the position detection signal of the current correction lens 103. Subsequently, in step S107, the addition-subtraction unit 212 subtracts the moving speed of the correction lens 103 that was acquired in S103 from the shake angular velocity of the entire image pickup apparatus that was acquired in S101. Thereby, shake correction remainder angular velocity of the image pickup apparatus is acquired. The shake correction remainder angular velocity is angular velocity that corresponds to a velocity change in the correction value that remains after correcting the deviation of the photographing optical axis to the image capture unit 109 due to the shaking of the image pickup apparatus by the traveling of the correction lens 103.

In a second process that is executed in parallel with the first process, a process that acquires the motion vector and a process that calculates a compensation value for compensating the shake correction remainder are executed. In the process that acquires the motion vector, the motion vector is detected from the difference between the pixel positions regarding a plurality of images as described below. Accordingly, this process is a process that is executed depending on a sampling time during which a plurality of image data can be acquired. The sampling of the motion vector may be executed at a timing that is different from the timing for acquiring the detection signal of the angular velocity sensor 201. In that case, the deviation of the sampling in these processes can be handled by holding the output information by the processing in which the sampling is slower as a constant value, during the period of processing in which sampling is faster.

In S108, the image capture unit 109 converts an optical signal into an electric signal and acquires image information. Next, the image capture signal processing unit 110 converts the image information from an analog signal to a digital signal, and performs a predetermined image processing. In S109, the motion vector is detected. The motion vector detection unit 206 compares the image information (S114) that is one previous frame stored in advance with the image information about the current frame. The motion vector is calculated based on the deviation of these images. As a method of detecting the motion vector, there are a known correlation method, a block matching method, and the like. As one example, the block matching method is employed in the motion vector detection unit 206. In the block matching method, a process that divides an input image signal into a plurality of suitable sized blocks (for example, 8×8 pixels) is performed, and a difference from the pixel in a range of the previous frame is calculated for each divided block. Subsequently, a process that searches a block of the previous frame in which the sum of the absolute values of the calculated difference becomes a minimum value is executed. The relative deviation of the searched block is detected as a motion vector of the block. However, this motion vector calculation method is one example, and the motion vector calculation method that can be applied in the present invention is not limited thereto.

In S110, the motion vector processing unit 203 acquires the motion vector that has been calculated in S109, and converts it into information corresponding to the angular velocity. Next, in S116, the control unit 119 determines whether or not the zoom is working. In a case where the zoom is working at the present moment, there is a possibility that the motion vector in S110 is not correctly acquired. Thus, the process proceeds to S119. Additionally, in a case where the zoom is not working at the present moment, the process shifts to S117.

In S119, the control unit 119 initializes the adaptive digital filter 204. A coefficient value of the adaptive digital filter 204 is initialized to zero or a value that has been preset in advance, and thereby the malfunction of the adaptive value of the adaptive digital filter 204 can be prevented. For example, in S119, if the initial value of the coefficient of the adaptive digital filter 204 is set to zero, the motion vector converges toward zero by the adaptive algorithm, but it takes along time to converge the coefficient value to a predetermined value. Accordingly, the coefficient value when the digital filter is adapted under a predetermined shaking condition is stored in a memory in advance, and the coefficient is initialized by using the stored values. Alternatively, initialization is performed by using the coefficient value held in the memory as an initial value, at the time when the user turns off the camera power supply the last time. A specified description will be given with reference to FIG. 4.

Figure 4:
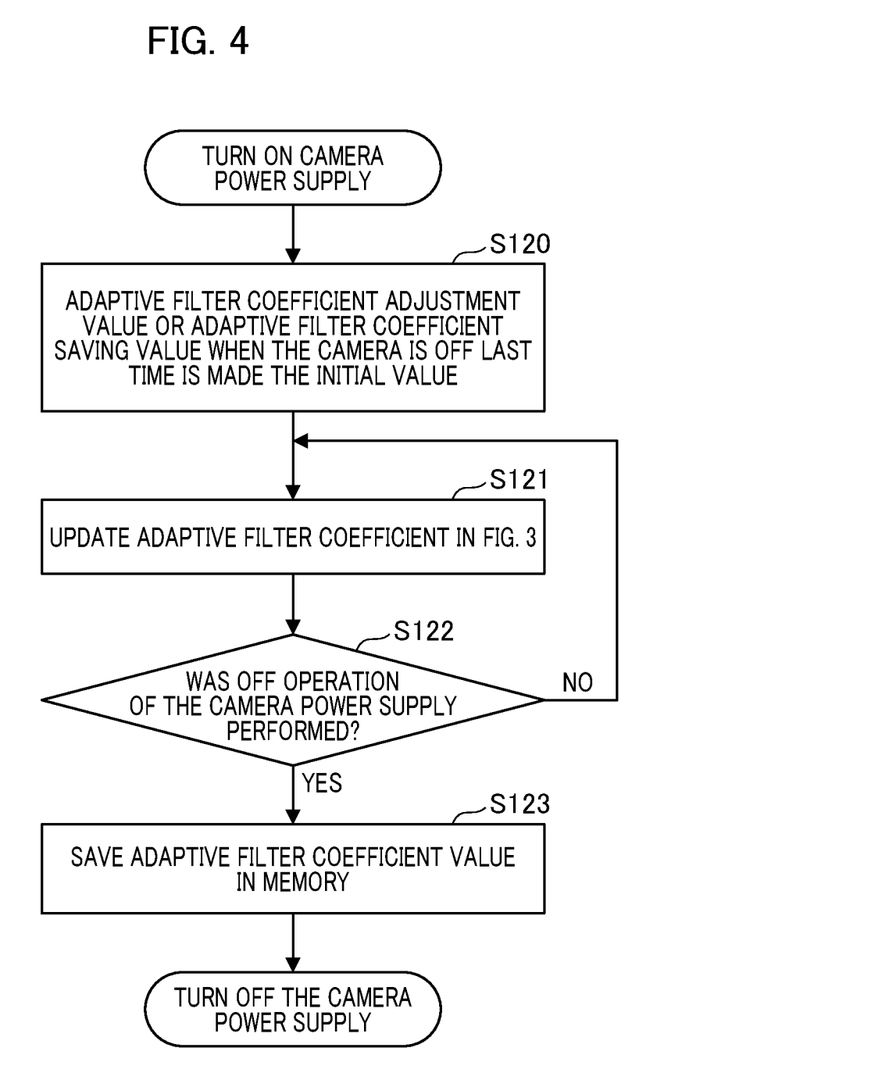
FIG. 4 is a flowchart that explains a status of a camera power supply and a saving operation of filter coefficients.

FIG. 4 is a flowchart illustrating an ON/OFF state of the camera power supply and a saving operation sequence of the adaptive digital filter coefficient. When the camera power supply is ON state, initialization processing of the filter coefficient is executed in S120 by using the following adjustment values or saved values:

an adaptive digital filter coefficient value that is adapted in advance under a predetermined shake condition, and an adjustment value stored in the memory; and a saved value of the adaptive digital filter coefficient that has been saved in the memory when the camera power supply is shut off the last time.

The predetermined shake condition is a condition, for example, corresponding to a situation in which shaking with a main frequency (1 to 10 Hz) due to a hand shaking is applied to the camera, and the coefficient value is stored in the memory in a situation in which the adaptive digital filter 204 is adapted to a shake correction remainder amount or the like at that time. The filter coefficient is set using the adjustment value or the saved value.

Next, in S121, the adaptive digital filter coefficient is updated in accordance with the process of FIG. 3. In S122, the control unit 119 determines whether or not the user performed the OFF operation of the camera power supply, and if the OFF operation was performed, the process proceeds to S123. When the OFF operation of the camera power supply is not performed, the process returns to S121. In S123, the control unit 119 saves the coefficient value of the adaptive digital filter 204 in a memory area. This memory area is an area where data is not erased even if the camera power supply is shut off.

Thus, with regard to the initial value of the adaptive digital filter coefficient, an adjustment value in the predetermined shake condition, or the saving value when the camera power supply was shut off last time is set. Therefore, in an environment in which the shake condition does not change significantly, the convergence time to a proper value of the adaptive digital filter coefficient can be shortened, and the shake correction performance can be increased.

Returning to the flowchart of FIG. 3, a description will be given of S117 and the subsequent steps. S117 and S118 are determination processes that compare each of the absolute values of the shake correction remainder angular velocity with the predetermined threshold values, and determine whether or not the value is more than or equal to the threshold value. The shake correction remainder angular velocity is calculated based on the motion vector or the detected information that has been detected by a shake sensor. The shake sensor is the angular velocity sensor 201 or an acceleration sensor 214 (FIG. 6) described below. In the following, the predetermined threshold values are set as a predetermined value 1 and a predetermined value 2, and the predetermined value 2 is set to be larger than the predetermined value 1. In S117, the control unit 119 determines whether or not the absolute value of the shake correction remainder angular velocity is more than or equal to the predetermined value 2. If the absolute value of the shake correction remainder angular velocity is more than or equal to the predetermined value 2, for example, a situation in which the image pickup apparatus is significantly shaken, as during a panning operation, is assumed. In such case, the process proceeds to S119, and the adaptive digital filter coefficient is initialized in order to prevent the malfunction of the adaptive digital filter. When the absolute value of the shake correction remainder angular velocity is less than the predetermined value 2, the process shifts to S118.

In S118, the control unit 119 determines whether or not the absolute value of the shake correction remainder angular velocity is more than or equal to the predetermined value 1. If the absolute value of the shake correction remainder angular velocity is smaller than the predetermined value 1, small shaking is assumed, and the adaptive value may not converge due to the influence of sensor noise. Hence, the process proceeds to S115, and the control unit 119 stops the adjustment of the adaptive digital filter coefficient, and holds the filter coefficient value. Additionally, in S118, when the absolute value of the shake correction remainder angular velocity is more than or equal to the predetermined value 1, the process proceeds to S111.

In S111, the control unit 119 determines whether or not the second switch SW2 is ON by the depression of the release button (In other words, whether or not the exposure has started). When the second switch SW2 is ON, the process proceeds to S115, and when the second switch SW2 is OFF, the process shifts to S112. In S112, the adaptive algorithm unit 211 changes the transmission characteristic of the adaptive digital filter 204 by a connection operation (ON) of the switching unit 216 in FIG. 2. That is, the adaptive algorithm unit 211 adjusts the filter coefficient value of the adaptive digital filter 204 by using the motion vector that was acquired in S110 and the information about the shake correction remainder angular velocity that was acquired in S107. The filter coefficient value is changed after the adjustment and reflected in the adaptive digital filter 204. A description will be given below of the adjustment of the adaptive digital filter coefficient by the adaptive algorithm.

In S111, when the second switch SW2 is ON, the switching unit 216 in FIG. 2 is shut off and turned to an OFF state, and the adjustment of the adaptive digital filter coefficient value by the adaptive algorithm unit 211 stops. The coefficient value of the adaptive digital filter 204 is held at the value immediately before the exposure (S115). The process proceeds to S113 after the processes of S112, S115, and S119.

In S113, the adaptive digital filter 204, in which the filter coefficient value that has been adjusted by the adaptive algorithm unit 211 is reflected, acquires the shake correction remainder angular velocity that was output from the addition-subtraction unit 212 and executes the filter processing. The shake correction remainder compensation value is calculated by the filter processing. Then, in S104, on the basis of the angular velocity detection signal of the angular velocity sensor 201, the target position calculation unit 205 calculates the target position of the correction lens 103. The target position is a position of the correction lens 103 for cancelling the image shake caused by shaking such as hand shaking.

In S105, the position control of the correction lens 103 is performed. The addition-subtraction unit 210 adds and subtracts the target position of the correction lens 103, the detected position of the correction lens 103 that is output from the A/D converter 208, and the shake correction remainder compensation value, and outputs the calculation result to the control filter 207. The control filter 207 calculates a feedback control amount so that the position of the correction lens 103 tracks the target position, in response to the output of the addition-subtraction unit 210. The image shake correction lens drive unit 104 controls the drive of the correction lens 103 in accordance with the output of the control filter 207. The correction lens 103 moves in a direction orthogonal to the photographing optical axis, and image shake correction operation is performed (S106).

Figure 5:
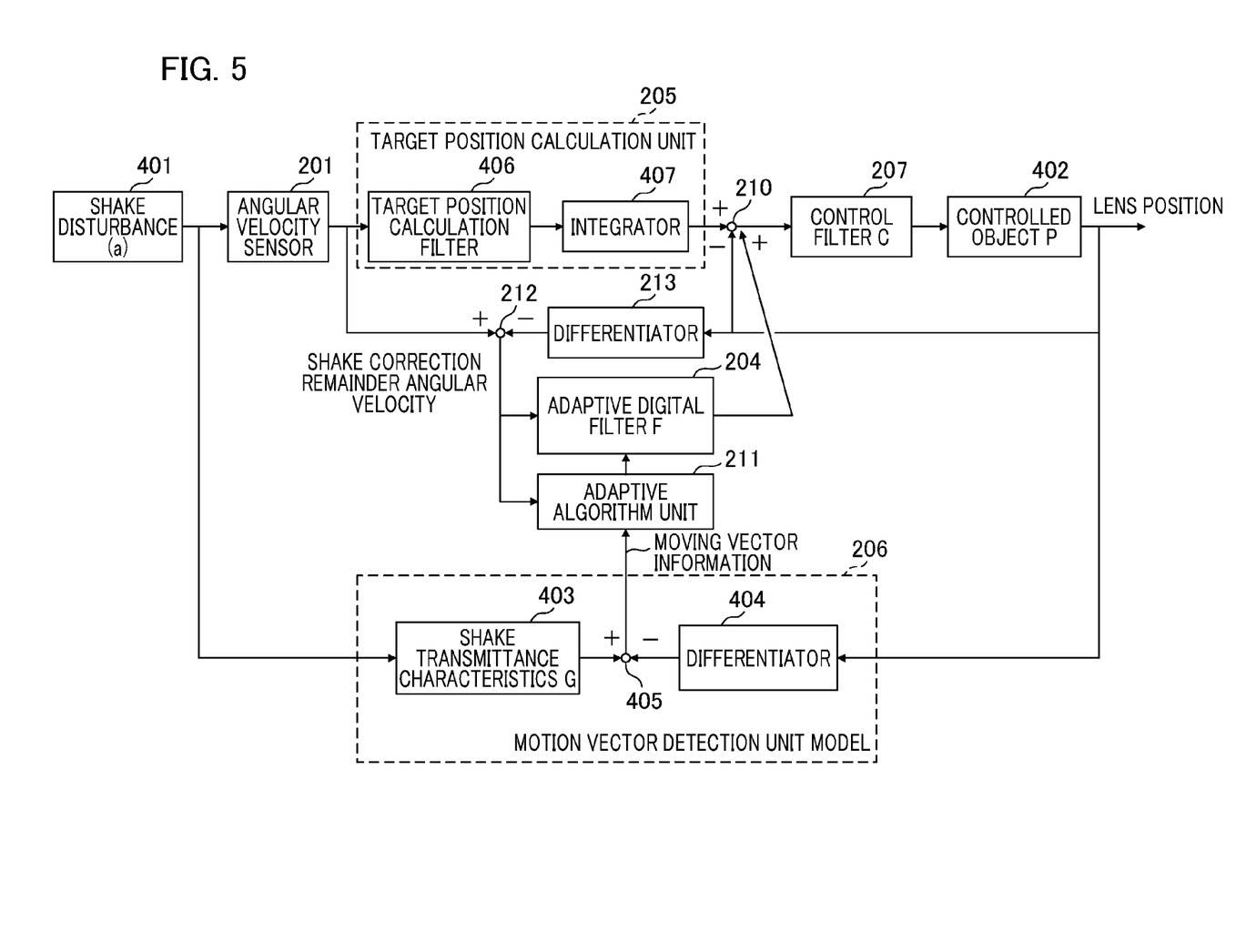
FIG. 5 is a block diagram for explaining an adaptive operation principle using a motion vector of the invention.

Next, referring to FIG. 5, a description will be given of the principle of an adaptive operation using the motion vector in the present embodiment. FIG. 5 is a block diagram illustrating a main part of the feedback control system. The angular velocity sensor 201, which is an external sensor, observes shake disturbance 401(a) such as hand shaking. The shake disturbance (angular velocity) that has been observed is processed by a target position calculation filter 406 in the target position calculation unit 205 (see dotted frame) and performs band limitation. An integrator 407 in the target position calculation unit 205 integrates a band-limited signal and converts it into an angle signal. Accordingly, the target position of a controlled object 402(P) is acquired and output as a positive input to the addition-subtraction 210.

In has been known that the detection value of the angular velocity sensor 201 includes a stationary offset error, a drift error with respect to temperature fluctuations, and low frequency noise such as low frequency modulation. In order to remove the influence on the image shake correction errors due to the low frequency noise, for example, a high-pass filter is used for the target position calculation filter 406. Hence, if shake correction is performed in accordance with the target position of the image shake correction that has been calculated by the integrator 407, there is a possibility that the shake correction remainder with respect to the low frequency shaking occurs. Accordingly, in the present embodiment, processing in which a compensation value for compensating for the shake correction remainder is added to the target position of the correction lens 103 is performed. Reducing the shake correction remainder makes it possible to improve the image shake correction performance.

In the processing that detects the shake correction remainder, the differentiator 213 differentiates the detected position of the correction lens 103, and outputs the lens speed as a negative input to the addition-subtraction unit 212. The addition-subtraction unit 212 acquires an angular velocity detected by the angular velocity sensor 201 as a positive input, and subtracts the speed of the correction lens 103. The calculation result of the addition-subtraction unit 212 can be used as a shake correction remainder angular velocity. However, this shake correction remainder angular velocity is calculated using the information that was detected by the angular velocity sensor 201, and thus it includes information such as the transmission characteristics, variation in sensitivity, the observation noise and the like of the angular velocity sensor 201. Therefore, this is not information that is equivalent to the shake disturbance 401(a). Additionally, the calculation result of the addition-subtraction unit 212 also includes differential information about the position of the correction lens 103, and thus, this result is affected by the influence of the observation noise of the lens position and the like. Accordingly, a method that uses a motion vector that can directly observe the shake correction remainder angular velocity from the image information is considered. In this case, information about a plurality of images is required for the detection of the motion vector. In the image pickup apparatus, although the image information can be acquired during the display of a through image, it is impossible to acquire an amount of change during exposure. The configuration of the motion vector detection unit 206 is shown in dotted frames of FIG. 5.

In the motion vector detection unit 206, shake transmittance characteristics 403(G) and a differentiator 404, and a subtracter 405 are shown. The detected information about the motion vector detection unit 206 (motion vector information) can be regarded as a difference signal between two signals. The first signal is a signal that passes through the transmittance characteristics 403(G) of shaking by the angular velocity sensor 201, the vector detection circuit, and the like from the information about the shake disturbance 401, and the second signal is a signal that is acquired by differentiating the position detection signal of the correction lens 103 by the differentiator 404. The subtractor 405 subtracts the second signal from the first signal, and outputs the difference signal to the adaptive algorithm unit 211.

The adaptive algorithm unit 211 observes the shake correction remainder angular velocity signal acquired as an output of the addition-subtraction unit 212, and executes the adaptive control of the adaptive digital filter 204(F). That is, the motion vector is adapted so as to approach zero, and then the shake correction remainder compensation value can be calculated by the shake correction remainder angular velocity signal. Specifically, in accordance with the adaptive algorithm, a process that changes the filter coefficient values of the adaptive digital filter is performed. At this time, the shake correction remainder angular velocity signal produced by the addition-subtraction unit 212, and the motion vector information are input to the adaptive algorithm unit 211. The adaptive digital filter 204 and the adaptive algorithm unit 211 are configured by digital filters. As described above, the motion vector information cannot be acquired during exposure. Accordingly, by the operation of the switching unit 216 of FIG. 2, other than during exposure, the adaptive algorithm unit 211 updates the coefficient values of the adaptive digital filter 204. The output of the adaptive digital filter 204 is transmitted to the addition-subtraction unit 210 as a positive input. In contrast, updating of the filter coefficient stops during exposure. Because a sudden change in the characteristics of shaking does not occur in a normal photographing, a process that adapts the filter to the characteristics of shaking until immediately before the start of exposure is thus executed. During exposure, image shake correction can be performed by using an adaptation value (coefficient value) immediately before exposure. Here, as a specific example of the adaptive digital filter, the content of the digital filter calculation by an FIR (Finite Impulse Response) filter will be explained.

When using the FIR filter, the relation formula below is satisfied. The degree of the filter is denoted by "n", the timing of sampling is denoted by "k". "k" takes an integer value. The filter output is denoted by "y(k)", the filter coefficient is denoted by "Ri(k)", and the shaking disturbance is denoted by "a(k)", . . . , a (k−n+1)". "i" is 0 or a value in the range from 1 to n−1.

$$y(k)=R0(k)\cdot a(k)+R1(k)\cdot a(k-1)+Rn-1(k)\cdot a(k-n+1) \quad \text{[Formula 1]}$$

The adaptive algorithm unit 211 updates the filter coefficient as shown in the following formula 2 by using motion vector information e(k).

$$R0\ (k+1) = R0\ (k) + M\cdot e\ (k)\cdot a\ (k) \quad \text{[Formula 2]}$$
$$\ldots$$
$$Rn\text{-}1\ (k+1) = Rn\text{-}1\ (k) + M\cdot e\ (k)\cdot a\ (k\text{-}n+1)$$

Here, "M" is an adaptive gain, and it is set to a value to which the filter coefficient converges.

In the present embodiment, the shake disturbance is observed by using the angular velocity sensor 201, and the compensation value from the adaptive digital filter 204 (formula 1) is added to the correction value at the addition-subtraction unit 210 as a feed forward input. Specifically, the addition-subtraction unit 210 adds the feedforward input to the calculation result that is acquired by subtracting the position detection signal of the correction lens 103 from the output of the target position calculation unit 205. Therefore, it is possible to reduce deviation of the detected phase of the angular velocity sensor 201, the gain (sensitivity) deviation, the deviation of tracking to the target position of the correction lens 103, and the shake correction remainder due to the filter setting of the target position calculation unit 205 and the like.

According to the present embodiment, based on the information about the image shake correction remainder that is acquired from the motion vector and the detected signal for shaking, the filter coefficient of the adaptive digital filter is adjusted, and a compensation value for the shake correction remainder is generated by using the adaptive digital filter. The image shake correction device is driven in accordance with the target position to which this compensation value has been added, and, the image shake correction accuracy can consequently be improved.

(Second Embodiment)

Figure 6:
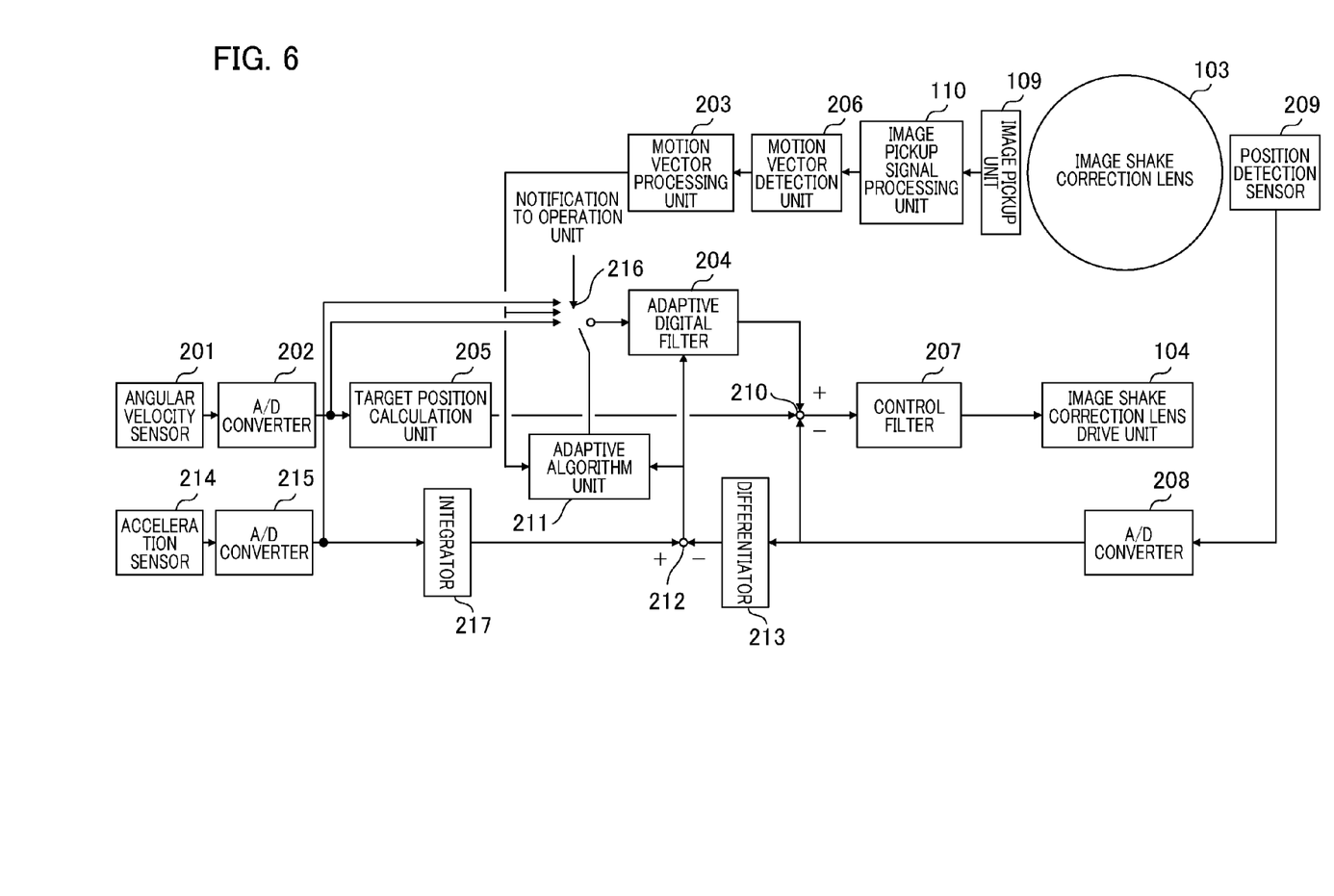
FIG. 6 is a block diagram illustrating a configuration according to a second embodiment of the present invention.

Next, a second embodiment of the present invention will be described. In the present embodiment, a description will be given, focusing on differences between the second embodiment and the first embodiment, and the detailed description of the components that are the same as those in the first embodiment will be omitted by using the reference numerals that have already been used. In the present embodiment, regarding the target position calculation of the correction lens 103 by the target position calculation unit 205, and a signal that is input to the adaptive algorithm unit 211, a description will be given of a process that uses the angular velocity sensor 201 and acceleration sensor 214. As shown in FIG. 6, the shake disturbance can be detected by using each sensor.

FIG. 6 illustrates a configuration example of a case that uses the speed information that is acquired by integrating the output of the acceleration sensor 214 by the integrator 217, serving as the shake disturbance that is input to the adaptive algorithm unit 211. The differences between FIG. 6 and FIG. 2 are as follows:

The acceleration sensor 214, which detects an acceleration of shaking applied to the image pickup apparatus, has been added.

The A/D converter 215, which converts the acceleration detection signal that is output from the acceleration sensor 214 from an analog signal into a digital signal, is provided.

The integrator 217, which integrates the output signal of the A/D converter 215 and outputs a speed signal, is provided.

The A/D converter 215 outputs a signal after conversion to each of the switching unit 216 and the integrator 217. The result of integration calculation of the integrator 217 is output to the addition-subtraction unit 212 as a positive input.

The present embodiment is similar to the first embodiment excepting that the shake disturbance (a) used in the formulae 1 and 2 described in the first embodiment are replaced by the integral value of the output of the acceleration sensor 214, and thus the detailed description will be omitted. According to the present embodiment, it is possible to further improve the image shake correction accuracy by the process that uses the angular velocity detection signal and the acceleration detection signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155113, filed Aug. 5, 2015, which is hereby incorporated by reference wherein in its entirety.

What is claimed is:

1. An image shake correction device that corrects an image shake of an image by an image shake correction unit comprising:
   an angular velocity sensor for acquiring a detection signal for shaking applied to an image pickup apparatus;
   an adaptive filter for calculating a compensation value for the correction value of the image shake correction by using the detection signal for shaking;
   at least one processor; and
   a memory storing instructions which when executed by the at least one processor cause the at least one processor to:
   acquire a motion vector detected from an image signal;
   calculate a correction value of image shake correction from the detection signal for shaking;
   adjust transmittance characteristics of the adaptive filter by the detection signal for shaking and the motion vector; and
   control the image shake correction unit in accordance with the correction value and the compensation value;
   wherein the correction value is calculated on the basis of a target position and position information about the image shake correction unit, and
   wherein the image shake correction unit is controlled in accordance with a value that is acquired by adding the compensation value serving as a feed forward input to the correction value.

2. The image shake correction device according to claim 1, wherein the at least one processor adjusts the transmission characteristics by changing a filter coefficient value of the adaptive filter.

3. An image apparatus comprising:
   an image shake correction device for correcting an image shake of an image by an image shake correction unit;
   an image capture for capturing an object;
   an angular velocity sensor for detecting shaking applied to the image pickup apparatus and output a detection signal for the shaking;
   an adaptive filter for calculating a compensation value for the correction value of the image shake correction by using the detection signal for shaking;
   at least one processor; and
   a memory storing instructions which when executed by the at least one processor cause the at least processor to:
   detect a motion vector by using an image signal acquired by the image capture unit,
   calculate a correction value of image shake correction from the detection signal for shaking;
   adjust transmittance characteristics of the adaptive filter by the detection signal for shaking and the motion vector; and
   control the image shake correction unit in accordance with the correction value and the compensation value;
   wherein the correction value is calculated on the basis of a target position and position information about the image shake correction unit, and
   wherein the image shake correction unit is controlled in accordance with a value that is acquired by adding the compensation value serving as a feed forward input to the correction value.

4. The image pickup apparatus according to claim 3, further comprising an acceleration sensor configured to detect shaking of the image pickup apparatus,
   wherein the adaptive filter further acquires a detection signal produced by the acceleration sensor and calculates the compensation value, and
   wherein the at least one processor further acquires the detection signal produced by the acceleration sensor and adjusts transmission characteristics of the adaptive filter.

5. The image pickup apparatus according to claim 3, wherein the angular velocity sensor detects an angular velocity of the shaking of the image pickup apparatus.

6. The image pickup apparatus according to claim 4, wherein the acceleration sensor detects an acceleration in the shaking of the image pickup apparatus.

7. The image pickup apparatus according to claim 3, wherein the the at least one processor performs adjustments until just before the start of exposure by the image capture unit, and during exposure, the at least one processor maintains a filter coefficient value of the adaptive filter before the start of exposure.

8. The image pickup apparatus according to claim 3, wherein the at least one processor computes a speed by subtracting a moving speed of the image shake correction unit from an angular velocity of shaking detected by the angular velocity sensor,
   wherein the at least one processor performs an adjustment if the speed that was computed is more than or equal to a first threshold, and smaller than a second threshold.

9. The image pickup apparatus according to claim 8, wherein the the at least one processor adjusts the transmittance characteristics of the adaptive filter to predetermined characteristics if a change in a focal length of an imaging optical system is performed or if speed that was computed is more than or equal to the second threshold.

10. The image pickup apparatus according to claim 9, further comprising a storage for storing a filter coefficient value in a case where the adaptive filter is adapted under a shaking condition that has been set,
    wherein the processor adjusts the transmittance characteristics of the adaptive filter to predetermined characteristics by using the filter coefficient value that has been acquired from the storage.

11. The image pickup apparatus according to claim 3, further comprising a storage configured to store a filter coefficient value that has been set in the adaptive filter in a case where a power supply of the image pickup apparatus is shut off, wherein the processor adjusts the transmittance characteristics of the adaptive filter by using the filter coefficient value that has been acquired from the storage if the power supply is supplied again to the image pickup apparatus.

12. A control method of an image shake correction device that corrects an image shake of an image by an image shake correction unit comprising:

acquiring a detection signal for shaking, and a motion vector detected from an image signal;

calculating a correction value of image shake correction from the detection signal for shaking applied to the image pickup apparatus;

calculating a compensation value for the correction value of the image shake correction by an adaptive filter, by using the detection signal for shaking;

adjusting transmittance characteristics of the adaptive filter by the detection signal for shaking and the motion vector; and controlling the image shake correction unit in accordance with the correction value and the compensation value;

wherein the correction value is calculated on the basis of a target position and position information about the image shake correction unit, and wherein the image shake correction unit is controlled in accordance with a value that is acquired by adding the compensation value serving as a feed forward input to the correction value.

* * * * *